United States Patent
Hamashima et al.

(10) Patent No.: US 7,377,132 B2
(45) Date of Patent: May 27, 2008

(54) CONDUIT FOR MOLTEN GLASS, MOLTEN GLASS DEGASSING METHOD AND MOLTEN GLASS DEGASSING APPARATUS

(75) Inventors: Kazuo Hamashima, Yokohama (JP); Yasuharu Hirahara, Yokohama (JP); Hajime Ito, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 465 days.

(21) Appl. No.: 11/066,489

(22) Filed: Feb. 28, 2005

(65) Prior Publication Data
US 2005/0229637 A1   Oct. 20, 2005

Related U.S. Application Data

(63) Continuation of application No. PCT/JP03/16976, filed on Dec. 26, 2003.

(30) Foreign Application Priority Data
Dec. 27, 2002   (JP) .............................. 2002-381106

(51) Int. Cl.
*C03B 5/225* (2006.01)
(52) U.S. Cl. .................. 65/134.2; 65/134.1; 65/134.9; 65/374.12; 65/346; 65/347
(58) Field of Classification Search .............. 65/134.1, 65/134.2, 134.9, 374.11, 374.12, 346, 347; 75/508, 512; 96/176, 193
See application file for complete search history.

(56) References Cited

U.S. PATENT DOCUMENTS 1,598,308 A * 8/1926 Pike ........................... 65/134.2

(Continued)

FOREIGN PATENT DOCUMENTS

EP    775671 A1    5/1997

(Continued)

OTHER PUBLICATIONS

U.S. Appl. No. 11/066,489, filed Feb. 28, 2005, Hamashima et al.

(Continued)

*Primary Examiner*—Eric Hug
(74) *Attorney, Agent, or Firm*—Oblon, Spivak, McClelland, Maier & Neustadt, P.C.

(57) ABSTRACT

A conduit for molten glass, a molten glass degassing method and a sub-atmospheric apparatus are provided, which are able to produce homogenous and good quality glass at low cost. A conduit for molten glass, which is capable of flowing molten glass in a horizontal direction, and to which vertical pipes are connectable, is disposed in a substantially horizontal direction. The conduit for molten glass can increase the area of a free surface of the molten glass by setting a width W at a larger value than a height H in cross-section and having an outline in cross-section comprising a convex curve. When the conduit for molten glass thus configured is used as a sub-atmospheric apparatus, it is possible to degas the molten glass effectively. Additionally, it is possible to have a sufficient strength since the convex curve forming the cross-section is elliptical. Further, it is possible to reduce costs by decreasing the amount of metal required for forming the cross-section.

10 Claims, 7 Drawing Sheets

U.S. PATENT DOCUMENTS

| | | | | |
|---|---|---|---|---|
| 4,110,097 | A | * | 8/1978 | Chevallier et al. .......... 65/134.3 |
| 6,119,484 | A | * | 9/2000 | Takei et al. ................. 65/134.2 |
| 6,286,337 | B1 | | 9/2001 | Palmquist |
| 2003/0066315 | A1 | * | 4/2003 | Sakai et al. .................... 65/157 |
| 2004/0134235 | A1 | * | 7/2004 | Pitbladdo ..................... 65/346 |

FOREIGN PATENT DOCUMENTS

| | | |
|---|---|---|
| EP | 1298094 A1 | 4/2003 |
| JP | 2-221129 | 9/1990 |
| JP | 9-142851 A | 6/1997 |
| JP | 2000-247647 A | 9/2000 |
| JP | 2000-290020 A | 10/2000 |
| JP | 2003-137556 A | 5/2003 |
| WO | WO 00/61506 A1 | 10/2000 |
| WO | WO 2004/037733 * | 5/2004 |
| WO | WO 2004/037733 A1 | 5/2004 |

OTHER PUBLICATIONS

U.S. Appl. No. 11/196,283, filed Aug. 4, 2005, Tomita et al.

* cited by examiner

| Cross-sectional shape | W/H ratio | Weight ratio | Number of bubbles (per kg) |
|---|---|---|---|
| Complete round | 1 | 1 | 2000 |
| Elliptical | 1.1 | 0.94 | 1700 |
| | 1.3 | 0.82 | 950 |
| | 1.5 | 0.74 | 500 |
| | 1.7 | 0.72 | 450 |
| | 1.9 | 0.7 | 450 |
| Rectangular | 1.0 | 1.13 | 800 |

A: ELLIPTICAL
A': ELLIPTICAL + CONCAVE/CONVEX
B: RECTANGULAR
C: RECTANGULAR + ROUNDED CORNERS

CONDUIT FOR MOLTEN GLASS, MOLTEN GLASS DEGASSING METHOD AND MOLTEN GLASS DEGASSING APPARATUS

TECHNICAL FIELD

The present invention relates to a conduit for molten glass, a molten glass degassing method and a molten glass degassing apparatus.

BACKGROUND ART

In general, the process for commercially producing glass is broadly classified into a melting step, a refining step and a forming step, and feeding equipment is disposed between steps as required. The melting of glass is done by supplying various kinds of powder materials in a furnace comprising refractories and by melting the supplied powder materials at a high temperature. In order to improve the quality and the homogeneity of such molten glass, it is inevitable to dispose a refining zone, such a sub-atmospheric apparatus.

Figure 10:
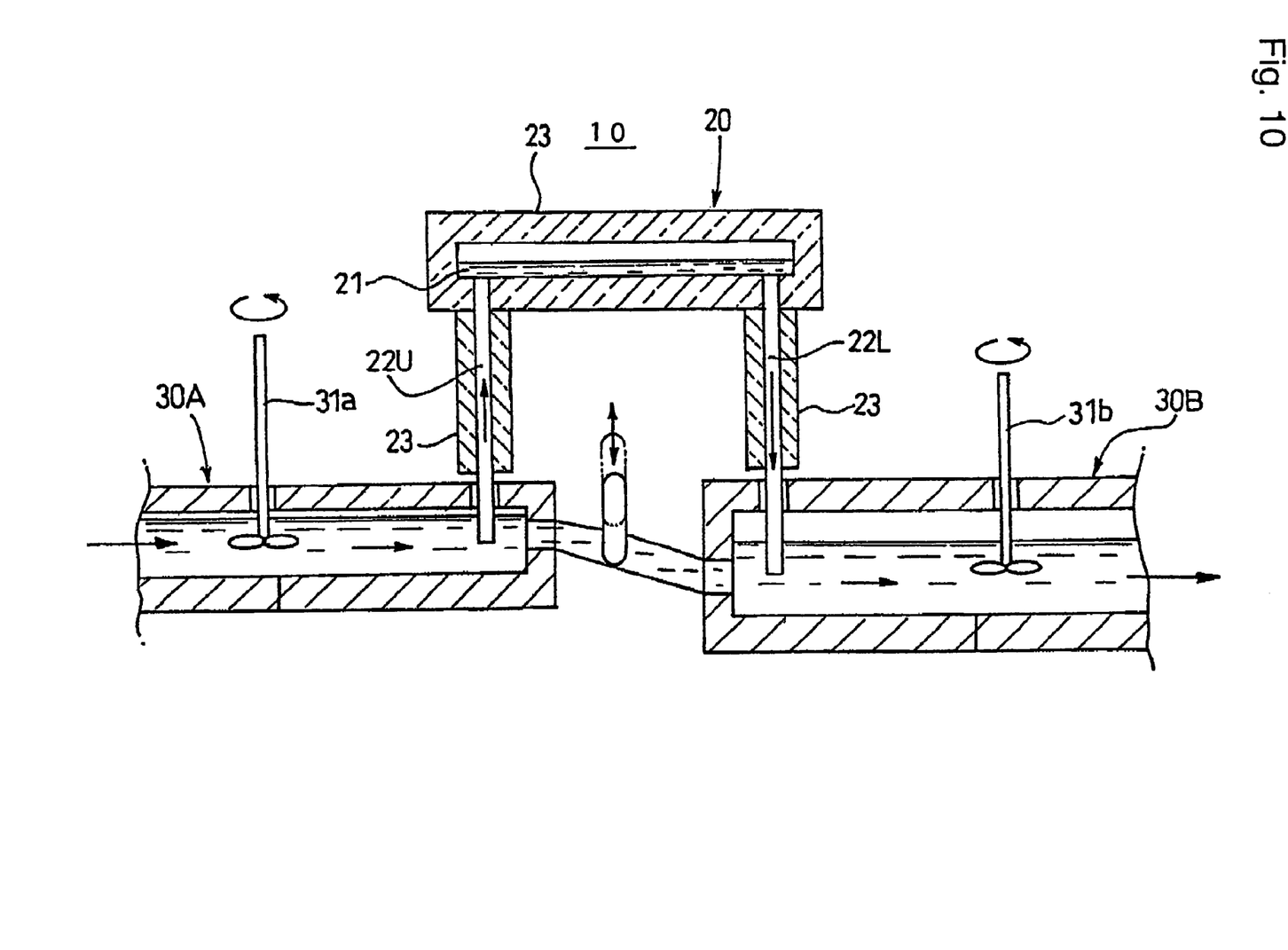
FIG. 10 is a vertical cross-sectional view of a conventionally known sub-atmospheric apparatus.

As such a sub-atmospheric apparatus, has been disclosed the one as shown in FIG. 10 (see, e.g., JP-A-9-142851).

Specifically, the sub-atmospheric apparatus 10 shown in this figure includes an upstream transferring canal 30A for supplying molten glass 21, an uprising pipe 22U for sending the molten glass 21 vertically and upward at a downstream end of the upstream transferring canal 30A, a sub-atmospheric vessel 20 disposed so as to extend substantially horizontally from an upper end of the uprising pipe 22U, a downfalling pipe 22L for sending the molten glass 21 vertically and downward from a downstream end of the sub-atmospheric vessel 20, and a downstream transferring canal 30B for further directing the molten glass 21 in a downstream direction from the downfalling pipe 22L.

The upstream transferring canal 30A includes a first stirrer 31a, and the downstream transferring canal 30B includes a second stirrer 31b.

The uprising pipe 22U, the sub-atmospheric vessel 20 and the downfalling pipe 22L are covered by casings 23.

The uprising pipe 22U, the sub-atmospheric vessel 20 and the downfalling pipe 22L are formed in an arched shape as a whole and serve to pump the molten glass 21 to the sub-atmospheric vessel 20 on the siphon principle and to utilize a pressure difference to remove bubbles contained in the molten glass 21.

Each of the sub-atmospheric vessel 20, the uprising pipe 22U and the downfalling pipe 22L comprises precious metal or the like in order to avoid reaction with the molten glass 21.

By this arrangement, the molten glass 21, which is being supplied from the upstream transferring canal 30A, is stirred by the first stirrer 31a on the way to the uprising pipe to change a dissolved gas into tiny bubbles and make the molten glass 21 uniform. The molten glass 21 is pumped to the sub-atmospheric vessel 20 through the uprising pipe 22U and is degassed in the sub-atmospheric vessel 20. The degassed molten glass 21 is directed to the downstream transferring canal 30B through the downfalling pipe 22L and is transferred to the forming step.

The most important property for the material of parts in direct contact with the molten glass 21 in the sub-atmospheric vessel 20 stated earlier is to prevent glass from being contaminated.

A similar required characteristic is also required for the material of the equipment for connecting respective melting, refining and forming zones to transfer the molten glass.

From this viewpoint, specific precious metal having a high melting point has been frequently utilized in the equipment, which deals with molten glass. In particular, when producing a glass product required for having functionality, it is more strongly encouraged to decrease the amount of impurities, which are introduced from the material of the parts.

However, it is not acceptable to use such precious metal in a large amount as in usual ferrous or nonferrous metal since such precious metal is extremely expensive. For this reason, the precious metal that is used in glass producing equipment has been formed in a thin plate to be utilized as a refractory structure lining or to be utilized as a thin cylindrical pipe having a complete round cross-section, which is the most difficult to collapse.

The arrangement wherein a refractory structure, such as the sub-atmospheric apparatus 10, is lined with precious metal as stated earlier has a problem of mismatching in thermal expansion between refractory and precious metal. For this reason, a thin cylindrical pipe made of precious metal and having a complete round cross-section is utilized.

However, it is inevitable to increase the diameter of such a cylindrical pipe to enlarge the cross-sectional area of the pipe since the amount of the molten glass 21 to deal with tends to increase recently. Several problems stated below have become evident because of such a demand to increase the diameter.

First, there is a problem that a mere increase in the diameter means a proportional increase in the amount of precious metal to use, which results in an explosive increase in equipment costs.

Next, there is a problem of glass defect, which is caused by the sublimation phenomenon of precious metal. Although this problem is rarely caused when molten glass is filled in a cylindrical pipe without gaps, this problem cannot be ignored since the cylindrical pipe is actually used, having spaces remaining therein, in a few cases.

In other words, a slight amount of oxide is caused to sublimate from a surface of precious metal when the precious metal is exposed to a high temperature of a thousand and several hundreds ° C. or above in the presence of oxygen in a sufficient amount. The oxide thus formed is not stable, and the oxide is reduced. by a subtle environmental change, causing tiny metal particles to be recrystallized. Tiny metal particles thus recrystallized are taken in the molten glass. Since the tiny metal particles in the molten glass are not completely dissolved, some of the particles are solidified and remain in the glass, causing quality defect.

The present invention is proposed in consideration of the problems stated earlier. It is an object of the present invention to provide a conduit for molten glass, a molten glass degassing method and a molten glass degassing apparatus, which are capable of producing homogenous and good quality glass at a low cost.

SUMMARY OF THE INVENTION

In order to attain the object stated earlier, the conduit for molten glass, according to the present invention comprises a metal conduit, which causes molten glass to flow in a horizontal direction while having a free surface, characterized in that the conduit has a width W set to be larger than a height H in cross-section, and that the conduit has an outline comprising a convex curve in cross-section.

The conduit for molten glass thus configured may be disposed to have an axis thereof extending in a substantially horizontal direction so as to flow the molten glass in the horizontal direction. The conduit for molten glass can increase the area of the free surface of the molten glass in comparison with a conduit having a complete round cross-section since the conduit according to the present invention is formed in a flat shape wherein the width W is larger than the height H perpendicular thereto in vertical cross-section perpendicular to the axis.

As a result, it is possible to degas the molten glass effectively by using the conduit according to the present invention as a molten glass degassing apparatus. Additionally, it is possible to have a sufficient strength since the outline in cross-section comprises such a convex curve.

The conduit for molten glass, according to the present invention may be configured so that a ratio of the width H to the height H ranges from 1.1 to 1.7.

By setting the ratio of the width H to the height H to range from 1.1 to 1.7 in the conduit for molten glass thus configured, it is possible to provide a sufficient strength to the conduit for molten glass, which causes the molten glass to flow in the horizontal direction.

In a preferred mode of the present invention, the conduit for molten glass is characterized in that the convex curve forming the outline in cross-section is elliptical.

The conduit for molten glass thus configured can have a sufficient strength since the convex curve is elliptical.

In a preferred mode of the present invention, the conduit includes portions, which have sizes in cross-section changing in an axial direction.

An example of the portions, which have sizes in cross-section changing in the axial direction, includes convex/concave portions or the like, each of which is formed in a continuous way at an angle of 360 degrees along a circumferential direction of the conduit for molten glass. The number of the convex/concave portions or the like has no limitations. The axial direction corresponds to a horizontal axial direction when the molten glass is flowed in the horizontal direction.

In accordance with the conduit for molten glass thus configured, it is possible to increase the strength since the portions, which have sizes in cross-section changing in the axial direction, can serve as a reinforced structure.

In a further preferred mode of the present invention, the conduit for molten glass comprises platinum or a platinum alloy.

The conduit for molten glass thus configured can minimize the amount of impurities invading the molten glass since platinum or a platinum alloy is used as a material for production of the conduit.

In a preferred mode of the present invention, the conduit for molten glass is characterized in that the conduit for molten glass has a wall thickness ranging from 0.4 to 1.6 mm.

By setting the wall thickness to range from 0.4 to 1.6 mm in the conduit for molten glass thus configured, it is possible to decrease the amount of a material used for production of the conduit for molten glass so as to reduce costs as well as to have a required strength.

Additionally, the molten glass degassing method according to the present invention is characterized in that the metal conduit comprises a conduit for molten glass stated earlier when molten glass is flowed in the horizontal direction in the metal conduit while the molten glass has a free surface, and an ambient pressure on the free surface is maintained at from 0.08 to 0.5 atm, thereby degassing the molten glass.

In accordance with the molten glass degassing method thus defined can minimize the occurrence of quality defects in glass since it is possible to obtain a high degassing efficiency.

Additionally, the molten glass degassing apparatus according to the present invention, which causes molten glass to flow in a horizontal direction in a metal conduit while the molten glass has a free surface, and maintains an ambient pressure on the free surface at from 0.08 to 0.5 atm, thereby degassing the molten glass, characterized in that the metal conduit comprises a conduit for molten glass stated earlier.

In accordance with the present invention thus defined, it is possible to have a required strength and to increase the area of the surface of a liquid to degas so as to reduce costs by decreasing the amount of platinum or the like used as a plate material required for production of the metal conduit.

BRIEF DESCRIPTION OF DRAWINGS

FIGS. 3(A), (B) and (C) show cross-sectional shapes for comparison of degassing capacity, wherein

FIGS. 6(A), (B) and (C) show cross-sectional shapes for comparison of compressive strength, wherein

(EXPLANATION OF REFERENCE NUMERALS)

10 sub-atmospheric apparatus
20 sub-atmospheric vessel (conduit for molten glass)
21 molten glass
22 vertical pipes
27 concave and convex portion

BEST MODE FOR CARRYING OUT THE INVENTION

The conduit for molten glass and the molten glass degassing apparatus according to the present invention have a similar structure to those stated earlier in reference to FIG. 10. Common parts are indicated by the same reference numerals, and explanation of the common parts will be omitted for avoiding repetition.

The conduit for molten glass is one that mainly serves to flow molten glass 21 in a horizontal direction as in, e.g., the sub-atmospheric vessel 20 in the molten glass degassing apparatus 10 shown in FIG. 10. The conduit is configured so as to be capable of connecting an uprising pipe 22U and a downfalling pipe 22L (hereinbelow, generally referred to as the vertical pipes 22) to both ends thereof and to have an axial direction extending in a substantially horizontal direction.

Figure 1:
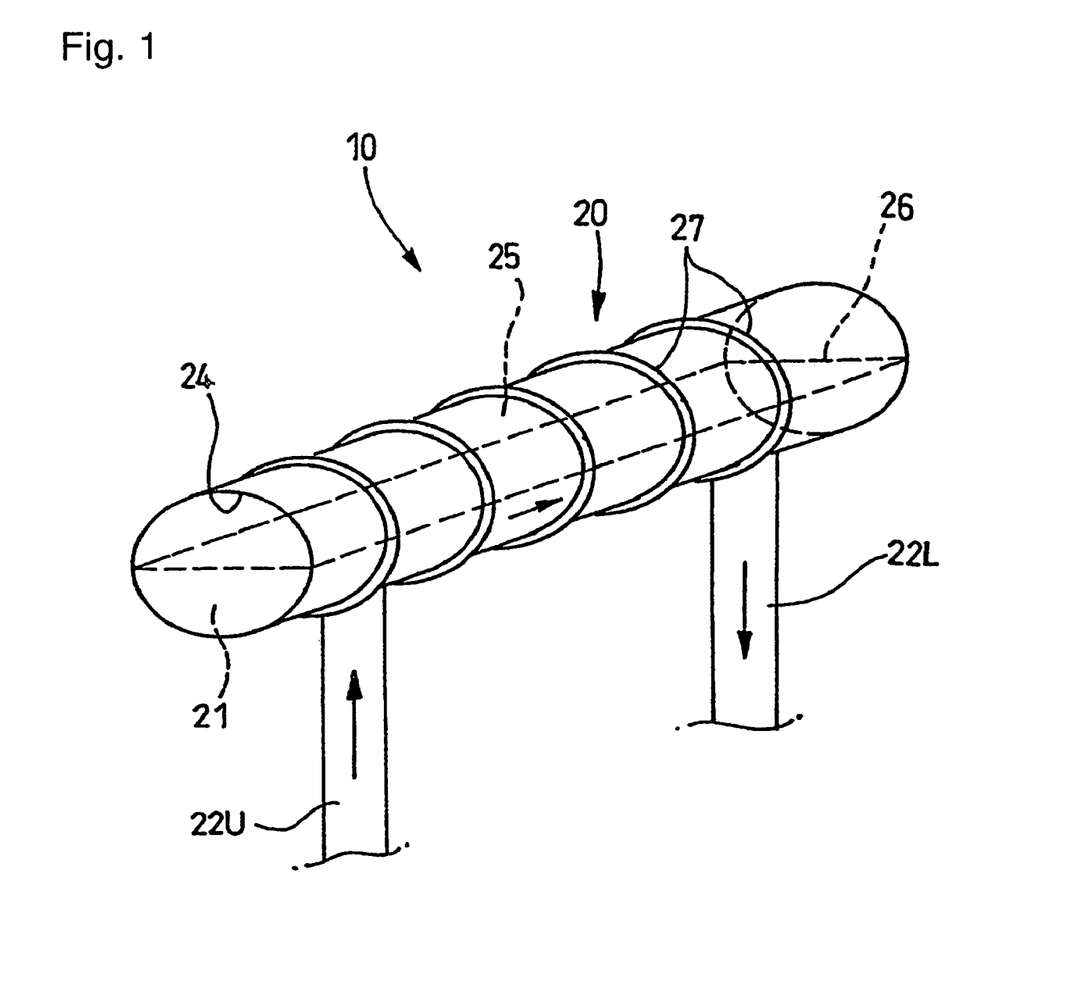
FIG. 1 is a perspective view showing the conduit for molten glass and the sub-atmospheric apparatus according to an embodiment of the present invention.

As shown in FIG. 1, the sub-atmospheric vessel 20 according to the present invention is disposed in a molten glass degassing apparatus 10 and serves to make the molten glass 21 homogeneous and provide the molten glass with better quality by degassing the molten glass 21 flowing in the horizontal direction. It is preferred that the sub-atmospheric vessel 20 have a wall thickness ranging from 0.4 mm to 1.6 mm.

When the molten glass 21 in the sub-atmospheric vessel 20 is kept hot in an insufficient way after having been heated to a high temperature, the molten glass fails to keep an uniform state in terms of temperature and composition. From this viewpoint, when the sub-atmospheric vessel comprises a metal conduit, which is generally excellent in heat conduction, the conduit needs to have a reduced wall thickness and to have an outer side with, e.g., a refractory casing 23 having good heat insulation (see FIG. 10).

Although it is advisable that the sub-atmospheric vessel 20 have a wall thickness of 1.6 mm or below, it is preferred that the sub-atmospheric vessel have a wall thickness of 0.4 mm or above. This is because when the wall is too thin, it is difficult to maintain a required form during machining or it is not possible to have a sufficient rigidity in use.

Figure 2:
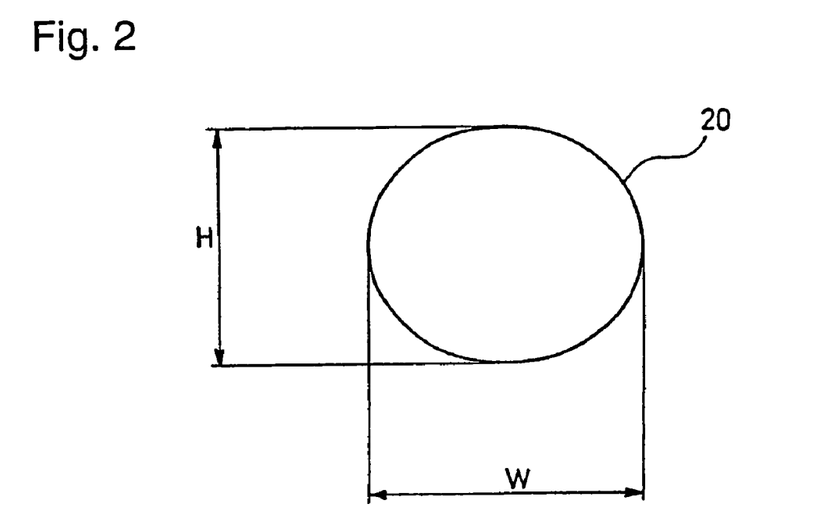
FIG. 2 shows a cross-sectional shape of a sub-atmospheric vessel of the sub-atmospheric apparatus according to the present invention.

As shown in FIG. 2, the sub-atmospheric vessel 20 is configured so as to have a larger width W than a height H in cross-section and to have an outer periphery (outline in cross-section) forming a convex curve. Although a typical example of the convex curve is an ellipse, examples of the convex curve include a combination of plural convex arcs, a form approximate to an ellipse and an oval besides an ellipse. This is because it is not preferable in terms of strength that the outline in cross-section contains an angular portion, in particular it is necessary to avoid a case wherein the outline in cross-section contains an angular portion having an interior angle of 150 degrees or below.

Bubbles in the molten glass 21 climb by buoyancy and escape into an upper atmosphere in the sub-atmospheric vessel 20. In some cases, some bubbles remain in the molten glass as defects of glass products because of their low climbing speed to make a glass product defective since the viscosity of the molten glass 21 is quite high.

From this viewpoint, in order to cause bubbles to effectively extinct from the molten glass 21, it is preferred that the molten glass 21 flowing in the horizontal direction have a shallower depth and that a free surface (liquid surface) 26 in contact with the upper atmosphere 25 have as larger an area as possible. However, when the sub-atmospheric vessel 20 is installed after a melting vessel for melting glass and ahead of a forming station for forming glass in a certain shape, it is general that the sub-atmospheric vessel 20 has limitations of installation space since the sub-atmospheric vessel needs to be installed in a limited region. When a used metal material comprises precious metal, it is necessary to limit the amount of the used material.

Explanation of the effectiveness by having an elliptical cross-section will be made, referring to a case wherein the sub-atmospheric vessel 20 is formed an elliptical shape in cross-section so as to have a ratio of width W/height H equal to 1.5.

When the amount of materials required for production of the sub-atmospheric vessel 20 is constant, and when the length of the sub-atmospheric vessel in a central axial (horizontal axial) direction is constant, the width W and the height H of the sub-atmospheric vessel 20 in cross-section are respectively 1.23 times and 0.82 time the diameter of a sub-atmospheric vessel 20 having a complete round cross-section. When the sub-atmospheric vessel 20 is formed of, e.g. platinum, it is preferred in terms of the strength and the cost of platinum that the width W be from 40 to 850 mm and that the height H be from 30 to 500 mm.

When the molten glass 21 is contained up to half the height in cross-section in the sub-atmospheric vessel 20 having such an elliptical cross-section in FIG. 1, the area of the free surface 26 in contact with the upper atmosphere 25 on the molten glass 21 is increased by 1.23 times in comparison with a sub-atmospheric vessel having a complete round cross-section, and the length that is required for a bubble at the deepest portion to climb and finally escape into the upper atmosphere is reduced by 0.82 time in comparison with the sub-atmospheric vessel having a complete round cross-section. The improvement in the degassing effect, which is obtained by an increase in the contact area between molten glass and atmosphere and a reduction in the climbing distance of bubbles, is extremely significant.

In a case wherein a sub-atmospheric vessel having an elliptical cross-section and a sub-atmospheric vessel having a complete round cross-section are made from precious metal so as to have the same thickness of each other, when the area of the free surface in contact with the upper atmosphere on molten glass contained up to half of the height in cross-section is common to both vessels, the amount of precious metal required for production of the sub-atmospheric vessel having an elliptical cross-section is smaller than the amount of precious metal required for production of the sub-atmospheric vessel having a complete round cross-section, and the former sub-atmospheric vessel can reduce the amount of precious metal by about 16%. The advantage offered by an elliptical cross-section is extremely significant since a reduction in the amount of precious metal as a material can be consistent with the improvement in the degassing effect by forming the sub-atmospheric vessel 20 in an elliptical shape in cross-section in this manner. This advantage can be also offered even when the sub-atmospheric vessel is formed in an ellipse-like shape approximate to an elliptical shape in cross-section.

On the other hand, a conventional sub-atmospheric vessel 20, which is normally formed from a thin metal plate having a wall thickness of less than 2 mm (see FIG. 10), has a complete round cross-section. This is because a complete round cross-section is strongest against applied stress in various directions and is excellent in compressive strength. This is also because when the metal plate is directly elliptically energized to be heated for instance, it is possible to minimize the possibility that an is abnormally heated portion is locally formed by segregation of an electric current during energization.

Specifically, the conventional sub-atmospheric vessel 20 made of metal is surrounded by and covered with a casing 23 comprising refractory bricks (see FIG. 10) for heat insulation. When the temperature of the sub-atmospheric vessel increases or changes, large stresses are caused in the sub-atmospheric vessel 20 because of the difference in terms of thermal expansion between the sub-atmospheric vessel 20 and the casing 23. Although these stresses can be dispersed in the most uniform way when the sub-atmospheric vessel has a complete round cross-section, stress concentration in an angular portion is inevitable when the sub-atmospheric vessel is formed in a quite angular shape (an angular shape containing an interior angle of, e.g. 150 deg or below).

When producing a sub-atmospheric vessel 20 having an angular portion, a wall thickness deviation is caused in the angular portion since the angular portion is normally formed by welding metal plates together or bending a metal plate. A portion having such a wall thickness deviation is likely to form an abnormally heated portion when applying current. Additionally, stress concentration is likely to occur in that portion since that portion is angular. When a structure wherein stress concentration or abnormally heating have occurred is used at a high temperature for long period of time, the metal material in such a region is selectively degraded.

It is possible that the sub-atmospheric vessel fails to have a lifetime as a whole as expected since a breakage is induced at this portion by such selective degration.

On the other hand, when the sub-atmospheric vessel 20 has an elliptical shape in cross-section, the chances that a portion having such stress concentration or an abnormally heating can hardly occur.

However, when the ratio of width W/height H is extremely large in such a sub-atmospheric vessel 20 having an elliptical cross-section, the sub-atmospheric vessel has a significantly flattened cross-section, which leads to a case wherein the sub-atmospheric vessel fails to have a sufficient resistance to applied stress from an upper portion for instance. From this viewpoint, it is preferred that the ratio of width W/height H be in a certain range. The ratio preferably ranges from 1.3 to 1.7 and more preferably from 1.4 to 1.6. The reason why the lower limit of the ratio of width W/height H is set at 1.3 or above is that it is difficult to obtain the advantage offered by an elliptical shape stated earlier outside this range.

Additionally, the conduit for molten glass, according to the present invention is also effective in terms of a reduction in the occurrence of a quality defect caused in the molten glass 21. As stated earlier, there is a possibility that platinum or a platinum alloy that forms the sub-atmospheric vessel 20 causes tiny defects in the molten glass 21 by repetition of the sublimation phenomenon and the deposition. The probability of such defects is proportional to the area of an inner surface out of contact with the molten glass 21 in the sub-atmospheric vessel 20, provided that the use environment, such as the temperature and the ambience, is constant. In this regard, it is possible to decrease the area of an inner surface out of contact with the glass in the sub-atmospheric vessel 20 by adoption of an elliptical shape in cross-section in comparison with adoption of a complete round shape or a rectangular shape in cross-section.

Additionally, some components sublimates from the molten glass 21 at a high temperature in many cases. The composition that have sublimated in the sub-atmospheric vessel 20 having the upper atmosphere 25 adheres to an inner wall of a ceiling portion 24 of the sub-atmospheric vessel 20. When the ceiling portion 24 has a curvature of a certain value or above, the adhered material returns into the molten glass, climbing down along a side wall without forming a sticked layer. However, the sublimated material that has returned into the molten glass can diffuse in the glass, spending a lot of time, since the flow rate of the glass is slow at a portion close to the side wall. As the results such sublimated material flows, as a heterogeneous component in the molten glass 21, out of the sub-atmospheric vessel 20 to cause a quality defect in the glass.

On the other hand, when the ceiling portion 24 has a small curvature, in particular when the ceiling portion is linear as in the case of the sub-atmospheric vessel having a rectangular cross-section, the adhered sublimated material forms a thick sticked layer on the inner wall of the ceiling portion 24 since it is difficult for the adhered sublimated material to easily climb down. Then, the adhered sublimated material as the thick layer drops into and returns to a central portion of the molten glass 21 where the flow rate of the glass in the sub-atmospheric vessel 20 is high. Thus, a substance comprising such a heterogeneous component can cause a quality defect in the glass since the substance can be prevented from diffusing in the glass in a sufficient way before leaving the sub-atmospheric vessel 20.

The material forming the conduit for molten glass, according to the present invention needs to be a material resistant to the molten glass 21 at a high temperature. The most typical example of such a material is platinum or a platinum alloy, but is not limited to these ones. It is acceptable to use gold, iridium or the like, depending on conditions, such as the composition of the glass, the working temperature or the atmosphere. When the working temperature is beyond 1,300° C., it is effective in terms of extended lifetime of the structure to use a dispersion-strengthened alloy wherein tiny ceramic particles are dispersed in a matrix comprising platinum or a platinum alloy.

Although the conduit for molten glass, according to the present invention has a higher strength than a conduit for molten glass, having an angular shape in cross-sectional as stated earlier, it is undeniable that the conduit for molten glass, according to the present invention is weaker to an external force than a conduit for molten glass, having a complete round cross-section.

Form this viewpoint, it is preferred to provide a reinforced structure to an outer peripheral portion of the sub-atmospheric vessel 20. With respect to such a reinforced structure, it is most effective to regularly form, e.g., portions wherein the sizes of the sub-atmospheric vessel 20 in cross-section change in the axial direction as shown in FIG. 1, such as concave and/or convex portions (hereinbelow, referred to as the concave/convex portions 27), each of which is formed in a continuous way at an angle of 360 deg along the peripheral direction of the sub-atmospheric vessel. Although typical examples of these concave/convex portions 27 are a continuous corrugated structure provided in the axial direction of the sub-atmospheric vessel 20 and lenticular structures provided with certain pitches, the concave/convex portions are not limited to these structures.

Although the concave/convex portions 27 as the reinforced structure may be formed by being subjected to press working by, e.g. a static pressure or a die after being formed in a tubular shape, or by being subjected, in the form of a plate, to press working by a forming roll before being formed in a tubular shape, the formation of the concave/convex portions is not limited to these methods. However, press working by a static pressure or a forming roll is superior in terms of making deviations in a wall thickness as small as possible since it is important to minimize deviations in the wall thickness of the sub-atmospheric vessel 20 in press working.

EXAMPLE 1

Now, specific examples of the conduit for molten glass and the sub-atmospheric apparatus according to the present invention will be described in detail based on the accompanying drawings. Parts common to the parts stated in connection with FIG. 10 are indicated by the same reference numerals, and explanation of the common parts will be omitted for avoiding repetition.

In this example, a metal plate, which had a wall thickness of 0.5 mm and was made of an alloy of Pt with 10 wt % of Rh, was used to produce sub-atmospheric vessels 20, which had a length of 300 mm, had the same volume as one another, and had a complete round cross-section, an elliptical cross-section and a rectangular cross-section. The weight and the degassing capacity of each of the sub-atmospheric vessels 20 were checked out. With regard to sub-atmospheric vessels 20 having an elliptical cross-section according to the present invention, five kinds of sub-atmospheric vessels were produced, having different ratios of width W to height H, i.e., W/H=1.1, 1.3, 1.5, 1.7 and 1.9.

Figure 3:
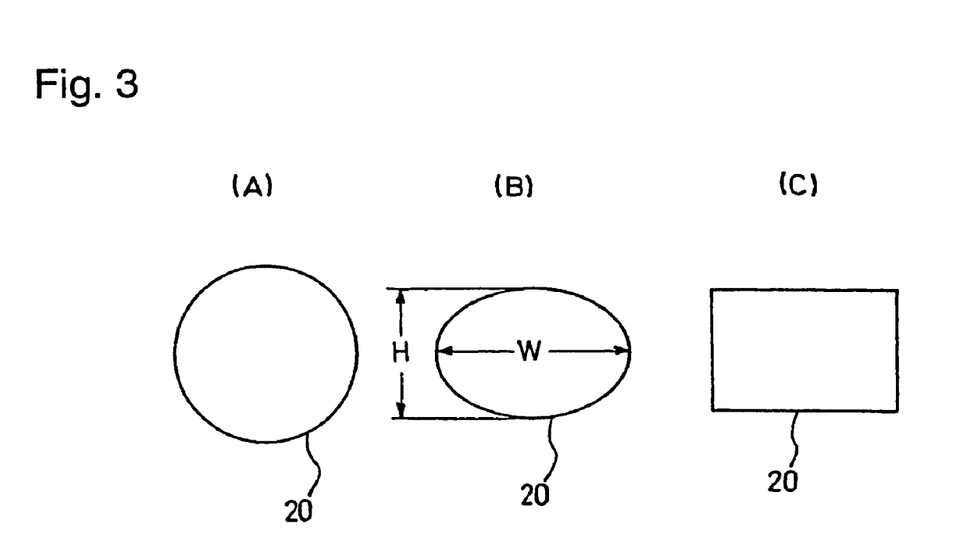
FIG. 3(A) shows a complete round cross-section.
FIG. 3(B) shows a cross-sectional shape according to the present invention.
FIG. 3(C) shows a rectangular cross-section.

FIGS. 3(A) to 3(C) are schematic cross-sectional views of sub-atmospheric vessels 20 thus produced, FIG. 3(A) shows the complete round cross-section, FIG. 3(B) shows an elliptical cross-section and FIG. 3(C) shows the rectangular cross-section. With respect to these cross-sections of the sub-atmospheric vessels 20, the complete round cross-section shown in FIG. 3(A) had a diameter of 50 mm, and the rectangular cross-section shown in FIG. 3(C) had of a height of 38 mm and a width of 55 mm.

The elliptical cross-sections as in the one shown in FIG. 3(B) had a height H of 48 mm and a width W of 52.5 mm for W/H=1.1, a height H of 44 mm and a width W of 57 mm for W/H=1.3, a height H of 41 mm and a width W of 61.5 mm for W/H=1.5, a height H of 38.5 mm and a width W of 65.5 mm for W/H=1.7 and a height H of 36 mm and a width W of 69 mm for W/H=1.9, respectively.

Figure 4:
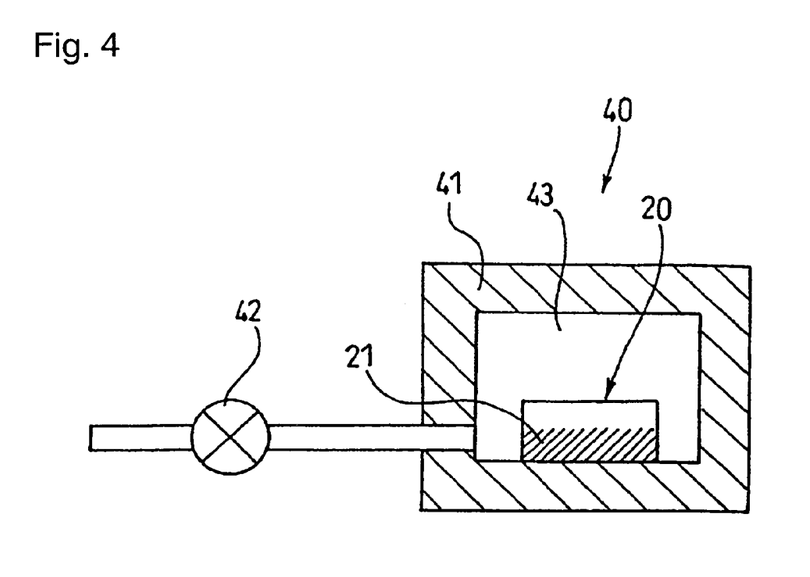
FIG. 4 is a cross-sectional view showing a measuring device for degassing capacity.

The degassing capacity of each of the sub-atmospheric vessels was measured, using a device 40 shown in FIG. 4, by the method stated below. First, a hole was formed in an upper portion of each of the sub-atmospheric vessels 20, crushed boro-silicate glass chips were supplied through the hole in an amount to occupy 50% of the internal space after being molten, and each of the sub-atmospheric vessels with the glass chips supplied thereinto was left to stand in an electric furnace 41 having a sealed chamber 43.

Figure 5:
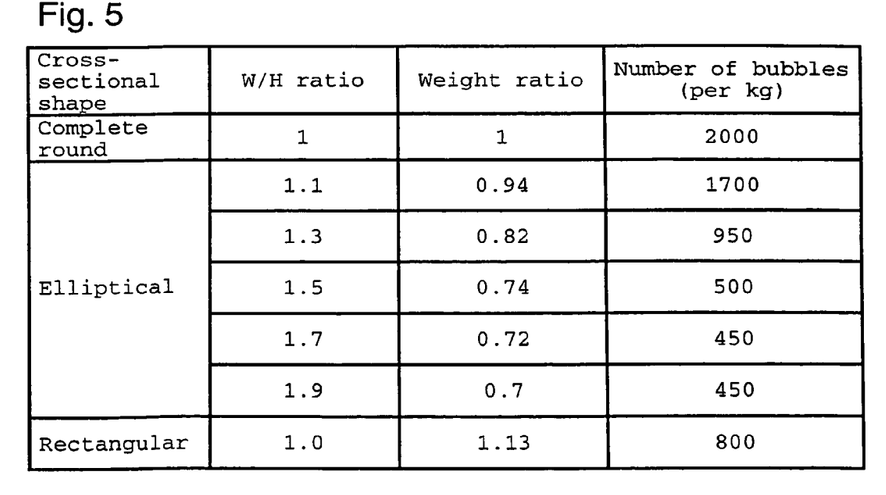
FIG. 5 is a table showing measurement results for degassing capacity.

Next, the inside of the electric furnace 41 was heated to 1,400° C., and the inside of the chamber 43 of the electric furnace was kept at 0.28 atm for 30 minutes by a vacuum pump 42. After that, the molten glass 21 was flowed out, and the numbers of bubbles contained in the obtained glass 21 in each of the sub-atmospheric vessels was counted. The results are shown in FIG. 5.

In the case of glass having a composition used in this test, it is preferred that the number of bubbles in a similar test be $1 \times 10^3$ (per kg) or below as one of the refining conditions suited for a desired application. From this viewpoint, when the sub-atmospheric vessel has an elliptical cross-section, it is revealed from FIG. 5 that the ratio of the width W to height H need to be 1.3 or above. It is also revealed that defects, which were supposed to be caused by sublimation or deposition of platinum, started occurring in the glass that was flowed out of the sub-atmospheric vessel having an elliptical cross-section having a ratio of width to height of 1.9 and the sub-atmospheric vessel having the rectangular cross-section, which is inappropriate.

EXAMPLE 2

Figure 6:
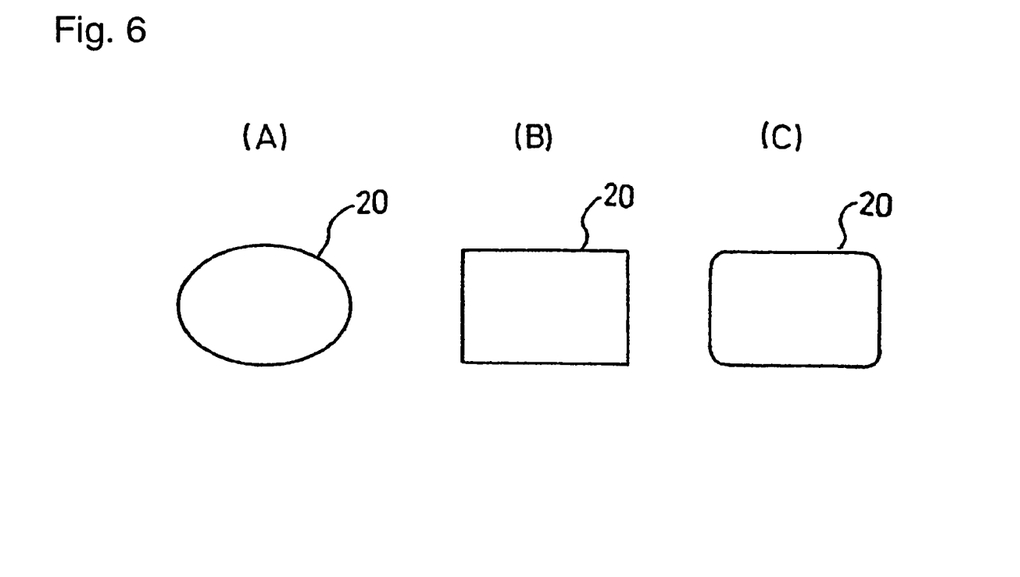
FIG. 6(A) shows an elliptical cross-section.
FIG. 6(B) shows a rectangular cross-section and FIG. 6(C) shows a rectangular cross-section having rounded corners.

In this example, an alloy of Pt with 10 wt % of Rh was used to produce sub-atmospheric vessels 20, which had the same wall thickness (0.6 mm), the same height in cross-section (200 mm) and the same longitudinal length (300 mm) as one another, and which had an elliptical cross-section shown in FIG. 6(A) (ratio of width to height: 1.5), had a rectangular cross-section shown in FIG. 6(B) and had a rectangular cross-section having rounded corners as shown in FIG. 6(C). Each of the sub-atmospheric vessels were compared to one another in terms of resistance to collapse by being subjected to a uniaxial compressive load.

With respect to the elliptical cross-section shown in FIG. 6(A), a sub-atmospheric vessel, wherein the corrugated concave/convex portions 27 as shown in FIG. 1 were formed with a pitch of 25 mm and at a difference of elevation of 5 mm on the outer peripheral portion, was also produced and was subjected to the same test.

Figure 7:
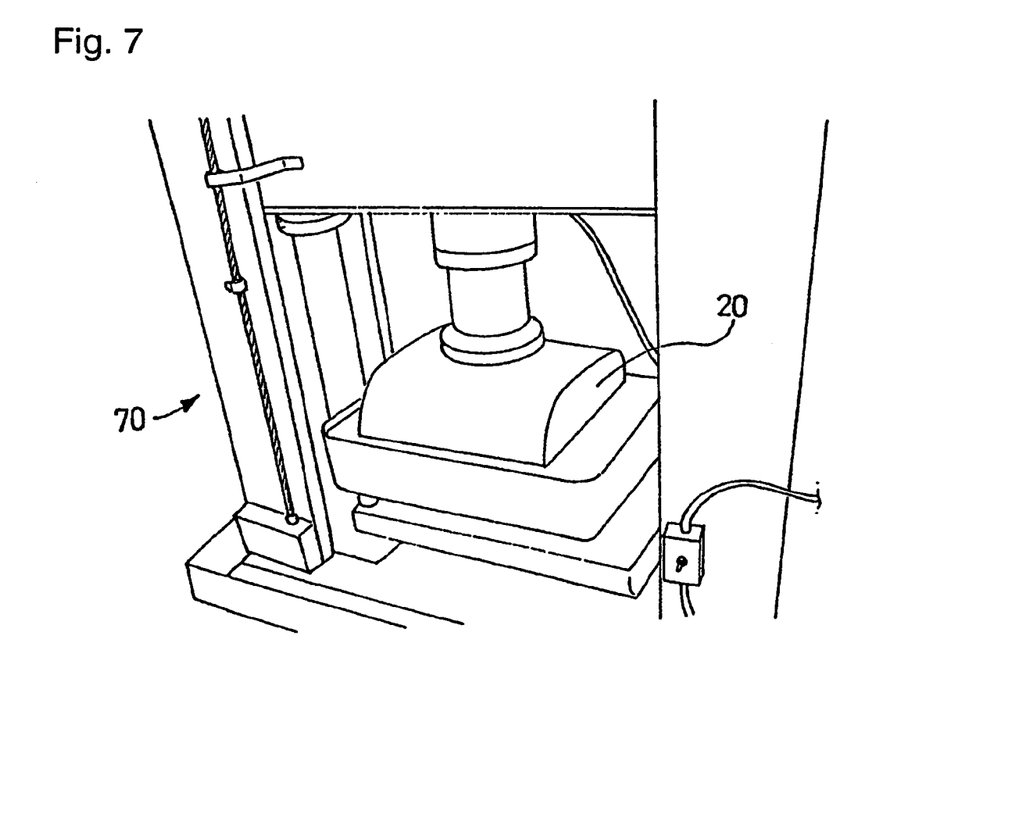
FIG. 7 is a perspective view of a machine for compression test.

The compression test was conducted with respect to the respective sub-atmospheric vessels 20 at room temperature in the atmosphere under the condition of a compression speed of 0.5 mm/min, using a Instron type testing machine in an arched shape 70 as shown in FIG. 7.

Figure 8:
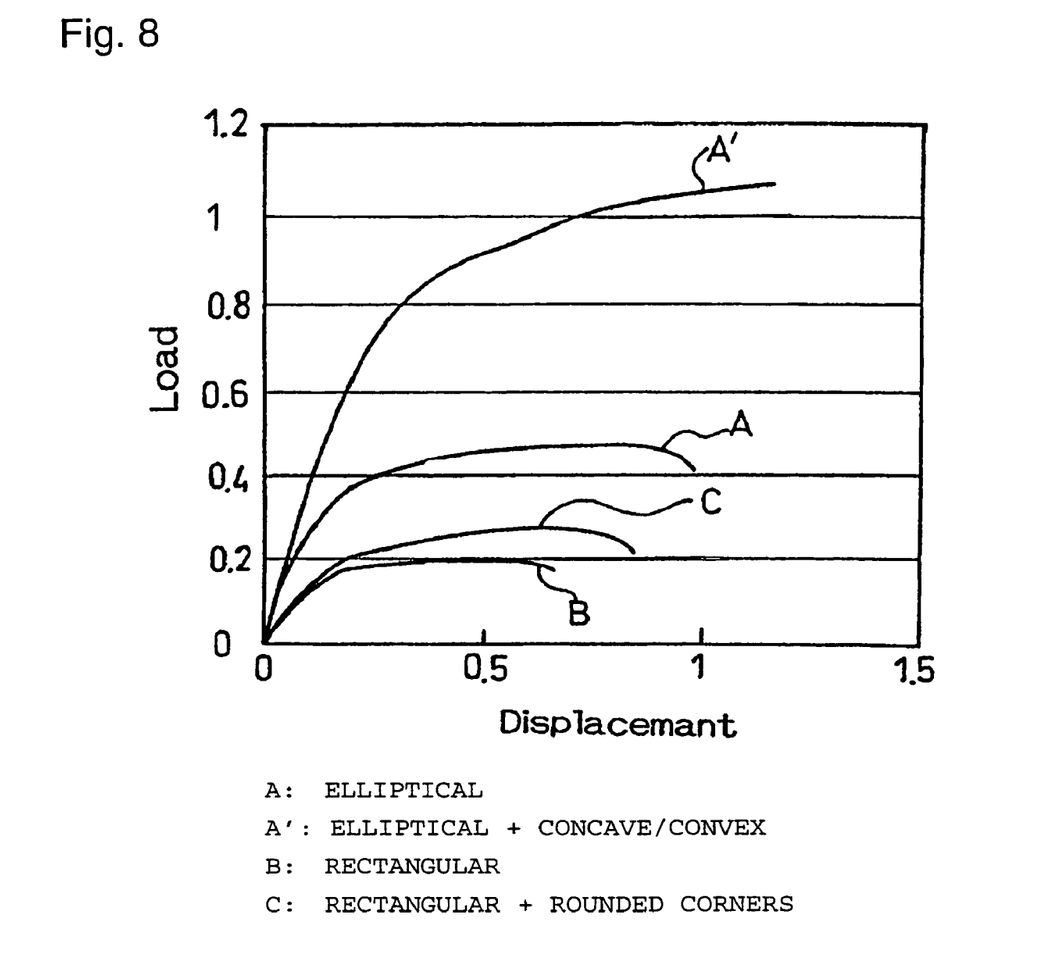
FIG. 8 is a graph showing measurement results for compressive strength.

The load-displacement curves obtained by this test are shown in FIG. 8. It was revealed from FIG. 8 that the elliptical cross-sections were stronger than the rectangular cross-sections, and in particular that the sub-atmospheric vessel having concave/convex portions 27 formed on an outer elliptical peripheral portion (indicated by A' in FIG. 8) was extremely strong.

EXAMPLE 3

Figure 9:
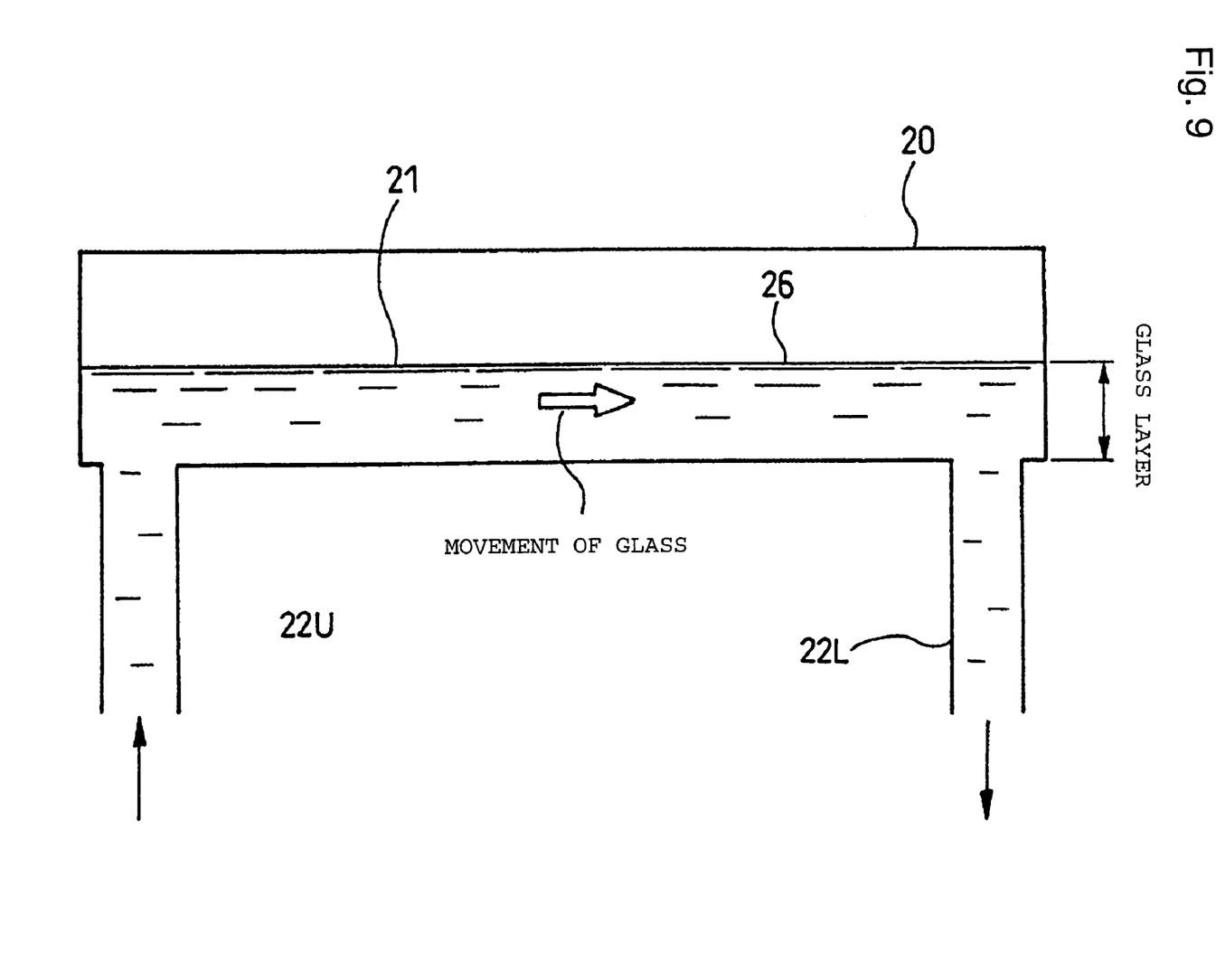
FIG. 9 is a cross-sectional view showing the sub-atmospheric vessel according to an embodiment of the present invention.

A sub-atmospheric vessel 20, which had a lower portion formed with an introduction portion and a discharge portion and caused molten glass 21 to flow in the direction indicated by an arrow to continuously refine the molten glass as shown in FIG. 9 as a cross-sectional view, and which was made of an alloy of Pt with 10 wt % of Rh, was configured to have a horizontal portion changed from a complete round shape to an elliptical shape in cross-section in a direction perpendicular to the drawing sheet.

A sub-atmospheric vessel having a complete round cross-section and the sub-atmospheric vessel having such an elliptical cross-section were designed so that the inner diameter of the introduction portion and the discharge portion, the distance from axis to axis of both portions, and the amount of the material used in the horizontal portion were constant. The diameter of the complete round cross-section was 250 mm, and the elliptical cross-section had a width W of 300 mm and a height of 200 mm. Both of the complete round cross-section and the elliptical cross-section had an entire length of 1,700 mm. When the ratio of width W/height H in an elliptical cross-section is set at 1.5, the height H and the length of the width W are about 0.8 times and about 1.2 times the diameter of the complete round cross-section.

Additionally, the sub-atmospheric vessel having such an elliptical cross-section had an outer peripheral portion formed with concave/convex portions 27 extending continuously in a circumferential form for reinforcement (see FIG. 1).

The sub-atmospheric vessel 20 having such an elliptical cross-section was used to depressurize and degas molten glass 21, which had the same temperature and the same composition (boro-silicate glass) as the molten glass dealt with by the sub-atmospheric vessel 20 having a complete round cross-section.

It was revealed that the travel speed of the molten glass 21 in the sub-atmospheric vessel 20 having such an elliptical cross-section was able to be 1.3 times that in the conventional sub-atmospheric vessel (the sub-atmospheric vessel having a complete round cross-section 20).

In accordance with the conduit for molten glass and the sub-atmospheric apparatus 10 stated earlier, it is possible to increase the area of the free surface 26 since the sub-atmospheric vessel 20 is formed in such a flat shape that the width W is larger than the height H perpendicular thereto in the outline shape in vertical cross-section.

When the conduit for molten glass, according to the present invention is used as the sub-atmospheric vessel 20 of the sub-atmospheric apparatus 10, it is possible to degas molten glass effectively. Additionally, it is possible to have a sufficient strength since the cross-section comprises outwardly convex arced surfaces extending in a continuous way, such as an elliptical curve. Further, it is possible to reduce the cost in comparison with conventional sub-atmospheric vessels having, e.g. a complete round cross-section since it is possible to decrease the amount of platinum or the like used for production of the sub-atmospheric vessel 20.

It should be noted that the conduit for molten glass and the sub-atmospheric apparatus according to the present invention are not limited to the embodiments stated earlier, and appropriate changes, modifications or the like may be made.

INDUSTRIAL APPLICABILITY

As stated earlier, in accordance with the conduit for molten glass, according to the present invention, it is possible to increase the area of the free surface of molten glass so as to degas the molten glass effectively and to have a sufficient strength since the width W is larger than the height H in cross-section and since the outline in cross-section comprises a convex curve.

Additionally, in accordance with the conduit for molten glass in a preferred embodiment of the present invention, it is possible to have a sufficient strength, even when flowing molten glass in the horizontal direction, by adopting a cross-section wherein the ratio of the width W to the height H ranges from 1.1 to 1.7.

Additionally, in accordance with the conduit for molten glass, according to the present invention, it is possible to have a sufficient strength since the convex curve forming the external outline is elliptical.

Further, in accordance with the conduit for molten glass, in another embodiment of the present invention, it is possible to increase the strength since portions of the conduit, which have sizes in cross-section changing in the axial direction, serve as a reinforced structure.

Additionally it is possible to minimize the amount of impurities invading the molten glass since precious metal, such as platinum or a platinum alloy, is used as the material for the conduit for molten glass.

Further, in accordance with the conduit for molten glass, in a preferred embodiment of the present invention, it is possible to have a certain strength and to decrease the amount of materials used for production of the conduit so as to reduce the costs by having a wall thickness ranging from 0.4 to 1.6 mm.

Additionally, in accordance with the molten glass degassing method and the molten glass degassing apparatus according to the present invention, it is possible to increase the area of the free surface of molten glass so as to degas the molten glass effectively and to have a sufficient strength since the conduit for molten glass, according to the present invention is used.

The content of the entire Description of Japanese Patent Application No. 2002-381106 (filed on Dec. 27, 2002 with the Japan Patent Office), on which a convention priority is claimed based, are hereby included by reference as the disclosure of Description of the present invention.

What is claimed is:

1. A conduit for molten glass, comprising:
   a metal conduit, which causes molten glass to flow in a horizontal direction while having a free surface, said conduit having a width W set to be larger than a height H in cross-section and having an outline comprising a convex curve in cross-section, said conduit including portions which have cross-sectional sizes which change in an axial direction.

2. The conduit for molten glass according to claim 1, wherein a ratio of the width H to the height H ranges from 1.1 to 1.7.

3. The conduit for molten glass according to claim 2, wherein the convex curve is elliptical.

4. The conduit for molten glass according to claim 1, including convex and/or concave portions located in a periphery of said conduit, formed continuously for 360 degrees about a circumferential direction, thereby changing said cross-sectional shape of said conduit.

5. The conduit for molten glass according to claim 1, said conduit comprising platinum or a platinum alloy.

6. The conduit for molten glass according to claim 5, the platinum or the platinum alloy comprises a dispersion-strengthened alloy.

7. The conduit for molten glass according to claim 1, said conduit having a wall thickness ranging from 0.4 to 1.6 mm.

8. The conduit for molten glass according to claim 1, wherein said conduit is used for a sub-atmospheric apparatus.

9. A molten glass degassing method, comprising:
   flowing molten glass in a horizontal direction in a metal conduit while the molten glass has a free surface, and
   maintaining an ambient pressure on the free surface at from 0.08 to 0.5 atm, thereby degassing the molten glass,
   said metal conduit comprising the conduit for molten glass as claimed in claim 1.

10. A molten glass degassing apparatus, which causes molten glass to flow in a horizontal direction in a metal conduit while the molten glass has a free surface, and maintains an ambient pressure on a free surface thereof of from 0.08 to 0.5 atm, thereby degassing the molten glass, said metal conduit comprising the conduit for molten glass as claimed in claim 1.

* * * * *